(12) United States Patent
Kastl et al.

(10) Patent No.: US 9,545,063 B1
(45) Date of Patent: Jan. 17, 2017

(54) OVERHEAD IRRIGATION ASSEMBLY HAVING THREE OR MORE TRUSS RODS

(71) Applicant: Valmont Industries, Inc., Omaha, NE (US)

(72) Inventors: John Kastl, Wahoo, NE (US); Dale A. Christensen, Arlington, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 14/616,984

(22) Filed: Feb. 9, 2015

Related U.S. Application Data (63) Continuation of application No. 13/592,699, filed on Aug. 23, 2012, now abandoned.

(60) Provisional application No. 61/526,509, filed on Aug. 23, 2011, provisional application No. 61/528,331, filed on Aug. 29, 2011.

(51) Int. Cl.
*A01G 25/09* (2006.01)
*E04B 1/19* (2006.01)

(52) U.S. Cl.
CPC ............ *A01G 25/09* (2013.01); *A01G 25/092* (2013.01); *E04B 2001/1975* (2013.01); *E04B 2001/1996* (2013.01)

(58) Field of Classification Search
CPC ................. A01G 25/092; A01G 25/09; E04B 2001/1996; E04B 2001/1997
USPC .............. 239/723, 728, 751; 248/58; 52/696
See application file for complete search history.

(56) References Cited

U.S. PATENT DOCUMENTS

| | | | | |
|---|---|---|---|---|
| 1,601,199 A | * | 9/1926 | Clapper | A01G 25/09 239/742 |
| 3,081,567 A | * | 3/1963 | Saul | E02F 3/7668 172/400 |
| 3,353,751 A | * | 11/1967 | Dowd | A01G 25/092 239/731 |
| 3,484,046 A | * | 12/1969 | Harris | A01G 25/092 239/731 |
| 3,558,257 A | * | 1/1971 | Harris | A01G 5/092 239/1 |
| 3,750,953 A | * | 8/1973 | Reinke | A01G 25/092 239/729 |
| 3,752,495 A | * | 8/1973 | Ross | A01G 25/092 180/14.1 |
| 3,946,946 A | * | 3/1976 | Hansen | A01G 25/092 239/728 |

(Continued)

FOREIGN PATENT DOCUMENTS

GB 704758 A * 3/1954 ............... E04B 1/19

*Primary Examiner* — Eret McNichols
(74) *Attorney, Agent, or Firm* — Milligan PC LLO (57) ABSTRACT

An overhead irrigation assembly having multiple truss rods is disclosed. In an implementation, an overhead irrigation assembly includes a first support, a second support, and a span of pipeline supported between the first support and the second support. The overhead irrigation assembly also includes a first truss rod tensioned between the first support and the second support and a second truss rod tensioned between the first support and the second support. Spreaders are suspended from the span of pipeline that are configured to separate the first truss rod from the second truss rod. The overhead irrigation assembly also includes a third truss rod is also tensioned between the first support and the second support. The first truss rod, the second truss rod, and third truss rod are configured to maintain a generally bow shape in the span of pipeline.

12 Claims, 5 Drawing Sheets

(56) References Cited

U.S. PATENT DOCUMENTS

| | | | | |
|---|---|---|---|---|
| 3,979,062 A * | 9/1976 | Christensen | ......... | A01G 25/092 239/11 |
| 3,983,898 A * | 10/1976 | Zimmerer | ............ | A01G 25/092 239/731 |
| 4,569,481 A * | 2/1986 | Davis | .................... | A01G 25/092 239/729 |
| 5,505,386 A * | 4/1996 | Stone | .................... | A01G 25/092 239/447 |
| 5,779,163 A * | 7/1998 | Gunter | ................. | A01G 25/092 239/728 |
| 6,042,031 A * | 3/2000 | Christensen | ......... | A01G 25/092 239/729 |
| 6,085,999 A * | 7/2000 | Gerdes | ................. | A01G 25/092 239/66 |
| 6,663,028 B2 * | 12/2003 | Malsam | ............... | A01G 25/092 111/118 |
| 6,902,351 B1 * | 6/2005 | McGee | ................ | A01G 25/092 239/728 |
| 7,066,414 B1 * | 6/2006 | McGee | ................ | A01G 25/092 239/728 |
| 7,229,032 B1 * | 6/2007 | Christensen | ......... | A01G 25/092 239/728 |
| 9,091,052 B1 * | 7/2015 | Summers | .............. | E04B 1/1903 |
| 2003/0029943 A1 * | 2/2003 | Malsam | ............... | A01G 25/092 239/722 |
| 2004/0069912 A1 * | 4/2004 | Healy | .................... | A01G 25/09 248/75 |
| 2006/0237564 A1 * | 10/2006 | Korus | .................. | A01G 25/092 239/729 |
| 2007/0176030 A1 * | 8/2007 | Korus | .................. | A01G 25/092 239/729 |
| 2008/0313992 A1 * | 12/2008 | Schornack | ........... | F16B 33/002 52/696 |
| 2010/0258658 A1 * | 10/2010 | Christensen | ......... | A01G 25/092 239/723 |
| 2011/0121111 A1 * | 5/2011 | Parod | ................... | A01G 25/092 239/735 |
| 2012/0080545 A1 * | 4/2012 | Korus | .................. | A01G 25/092 239/723 |
| 2012/0305682 A1 * | 12/2012 | Korus | .................. | A01G 25/092 239/731 |
| 2013/0008977 A1 * | 1/2013 | Pfrenger | .............. | A01G 25/092 239/69 |
| 2013/0048797 A1 * | 2/2013 | Kastl | .................... | A01G 25/092 248/58 |
| 2013/0087640 A1 * | 4/2013 | Pfrenger | .............. | A01G 25/165 239/723 |
| 2013/0253752 A1 * | 9/2013 | Grabow | ............... | G05D 1/0278 701/25 |
| 2013/0292194 A1 * | 11/2013 | Korus | .................... | B62D 55/08 180/9.1 |
| 2014/0008451 A1 * | 1/2014 | Christiansen | ........ | A01G 25/092 239/1 |

\* cited by examiner

OVERHEAD IRRIGATION ASSEMBLY HAVING THREE OR MORE TRUSS RODS

CROSS-REFERENCE TO RELATED APPLICATIONS

The present application is a Continuation under 37 C. F. R. 1.53(b) of U.S. patent application Ser. No. 13/592,699. Accordingly, the present invention claims priority to U.S. patent application Ser. No. 13/592,699 filed Aug. 23, 2012, which was originally filed as U.S. Provisional Application 61/526,509, entitled OVERHEAD IRRIGATION ASSEMBLY HAVING THREE OR MORE TRUSSES, filed on Aug. 23, 2011, and U.S. Provisional Application Ser. No. 61/528,331, entitled OVERHEAD IRRIGATION ASSEMBLY HAVING THREE OR MORE TRUSS RODS, filed on Aug. 29, 2011. U.S. Provisional Application Ser. No. 61/526,509 and U.S. Provisional Application Ser. No. 61/528,331 are herein incorporated by reference in their entireties. No new matter has been added.

BACKGROUND OF THE INVENTION

Modern day agriculture has become increasingly efficient in the past century and this trend must continue in order to produce a sufficient food supply for the increasing world population. A notable advancement in agricultural production was the introduction of mechanized irrigation systems, such as the center pivot and the linear move irrigation systems. These irrigation systems make it possible to irrigate entire fields, and reduce a crop yield's vulnerability to extreme weather conditions. The ability to monitor and to control the amount of water and/or nutrients (applicants) applied to an agricultural field has increased the amount of farmable acres in the world and increases the likelihood of a profitable crop yield. These irrigation systems typically include a control device configured to furnish a user interface allowing the operator to monitor and control one or more functions or operations of the irrigation system.

SUMMARY OF THE INVENTION

An overhead irrigation assembly having multiple truss rods is disclosed. In an implementation, an overhead irrigation assembly includes a first support, a second support, and a span of pipeline supported between the first support and the second support. The overhead irrigation assembly also includes a first truss rod tensioned between the first support and the second support and a second truss rod tensioned between the first support and the second support. Spreaders are suspended from the span of pipeline that are configured to separate the first truss rod from the second truss rod. The overhead irrigation assembly also includes a third truss rod which is also tensioned between the first support and the second support. The first truss rod, the second truss rod, and third truss rod are configured to maintain a generally bow shape in the span of pipeline.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The Detailed Description is described with reference to the accompanying figures. The use of the same reference numbers in different instances in the description and the figures may indicate similar or identical items.

DESCRIPTION OF THE PREFERRED EMBODIMENTS

Overhead irrigation equipment can be used to provide a moveable overhead sprinkler platform for supplying water and chemicals to assist with growing agricultural crops. One type of overhead sprinkler irrigation is center pivot irrigation, where segments of pipe are joined together and supported by trusses, mounted on wheeled towers with sprinklers positioned along the pipe segments. This type of configuration provides movement in a circular pattern and is supplied with water from a pivot point at the center of the circle. Center pivot irrigation systems may be powered using water, hydraulics, and/or electric motors. Another type of sprinkler irrigation is linear/lateral move irrigation, where similar equipment is configured to move in a straight line.

A bow strung trussing design may include a main water pipeline and two sets of truss rods supported by truss angles. The two truss rods are put into tension to create a "bow" in the main water pipeline. However, as spans of overhead irrigation equipment get longer, the tension load required in the truss rod to maintain the proper "bow" can be drastically increased. In some instances, a larger bow can be created to decrease the tension load in the truss rods. However, this may decrease the crop clearance and create a very large distance between the main water pipeline and the truss rods. This distance can make installation, service, and maintenance difficult. Increasing the diameter of the truss rods to accommodate more tension load may also be possible. However, this may increase the associated cost of the equipment.

Accordingly, an overhead irrigation assembly having three or more truss rods is provided. The overhead irrigation assembly can include an additional (third) rod in the bow strung truss design. In some implementations, the third truss rod can be a plurality of truss rod segments in a section of overhead irrigation equipment that allows lengthening of the section while decreasing the corresponding crown depth necessary to support the section. In other implementations, the third truss rod can be "floating" between the trusses, connected to either end of the span. For example, a suspended truss rod can have truss rod segments connected end-to-end. The truss rod segments connected at the end of the span can be threaded to allow adjusting after installation to allow balancing of the tension load in all three truss rods. The balancing can be accomplished by adjusting the tension load in the third truss rod until a desired distance is reached between the main water pipeline and the third truss rod, thereby creating desired "bow" dimensions.

In some instances, a vertical member can be attached to the main water pipeline, extending downward towards the third truss rod with a visual indicator identifying the ideal distance between the main water pipeline and the third truss rod, and therefore a desired tension load in the third truss rod. Further, a proximity switch between the vertical member and the truss rod can be provided, such that if an incorrect adjustment is made, and/or the loads change in the truss rods, and/or the "bow" in the span changes, the proximity switch will open, cutting power to the machine, and eliminating or reducing the likelihood of machine damage.

In some implementations, four or more truss rods can be included with an overhead irrigation assembly. This type of configuration may provide balanced strength and stability on each side of the span. For example, with a four truss rod design, failure of a single rod may result in stretching of the remaining rod, resulting in a "slow motion" failure. It may also be possible to operate the irrigation equipment for some time after a single rod breaks. Further, by increasing the total potential load that can be carried by the truss rods, longer spans with shallower trussing and/or flatter crowns may be possible, resulting in lower product costs (e.g., with fewer truss angles and/or fewer spans per machine), as well as better span stability.

Example Implementations.

FIGS. 1 through 5 illustrate overhead irrigation assemblies in accordance with the present disclosure. As shown, an overhead irrigation assembly 100 includes one or more spans of overhead irrigation equipment 102. Each span of overhead irrigation equipment 102 includes supports at either end of the span, such as wheeled towers 104, for supporting a main water pipeline, such as a span of pipeline 106. The span of pipeline 106 may comprise a number of pipe segments joined together and supported by trusses connected with truss rods to form a bow string truss. In some implementations, the overhead irrigation assembly 100 may comprise central pivot irrigation equipment. In other implementations, the overhead irrigation assembly 100 may comprise linear irrigation equipment. However, these implementations are provided by way of example only and are not meant to be restrictive of the present disclosure. Thus, the overhead irrigation assembly 100 may comprise other types of overhead irrigation equipment.

The overhead irrigation assembly 100 includes three or more truss rods tensioned between the wheeled towers 104. For example, a truss rod 108 and a truss rod 110 may be tensioned between the wheeled towers 104. In implementations, the truss rod 108 and the truss rod 110 comprise a number of truss rod segments 112 extending longitudinally between the wheeled towers 104. The truss rod segments 112 may be arranged end-to-end and separated using a number of spreaders 114 suspended from the span of pipeline 106. For example, spreaders 114 may be used to separate the truss rod 108 from the truss rod 110. The spreaders 114 may be suspended from the span of pipeline 106 using, for example, diagonals 116.

In some implementations, the overhead irrigation assembly 100 may also include a truss rod 118 tensioned between the wheeled towers 104. In this type of configuration, the truss rod 108, the truss rod 110, and the truss rod 118 are configured to maintain a bow shape in the span of pipeline 106. In other implementations, the overhead irrigation assembly 100 may include a truss rod 120 in addition to the truss rod 118 tensioned between the wheeled towers 104. In this type of configuration, the truss rod 108, the truss rod 110, the truss rod 118, and the truss rod 120 are configured to maintain the bow shape in the span of pipeline 106.

Figure 1:
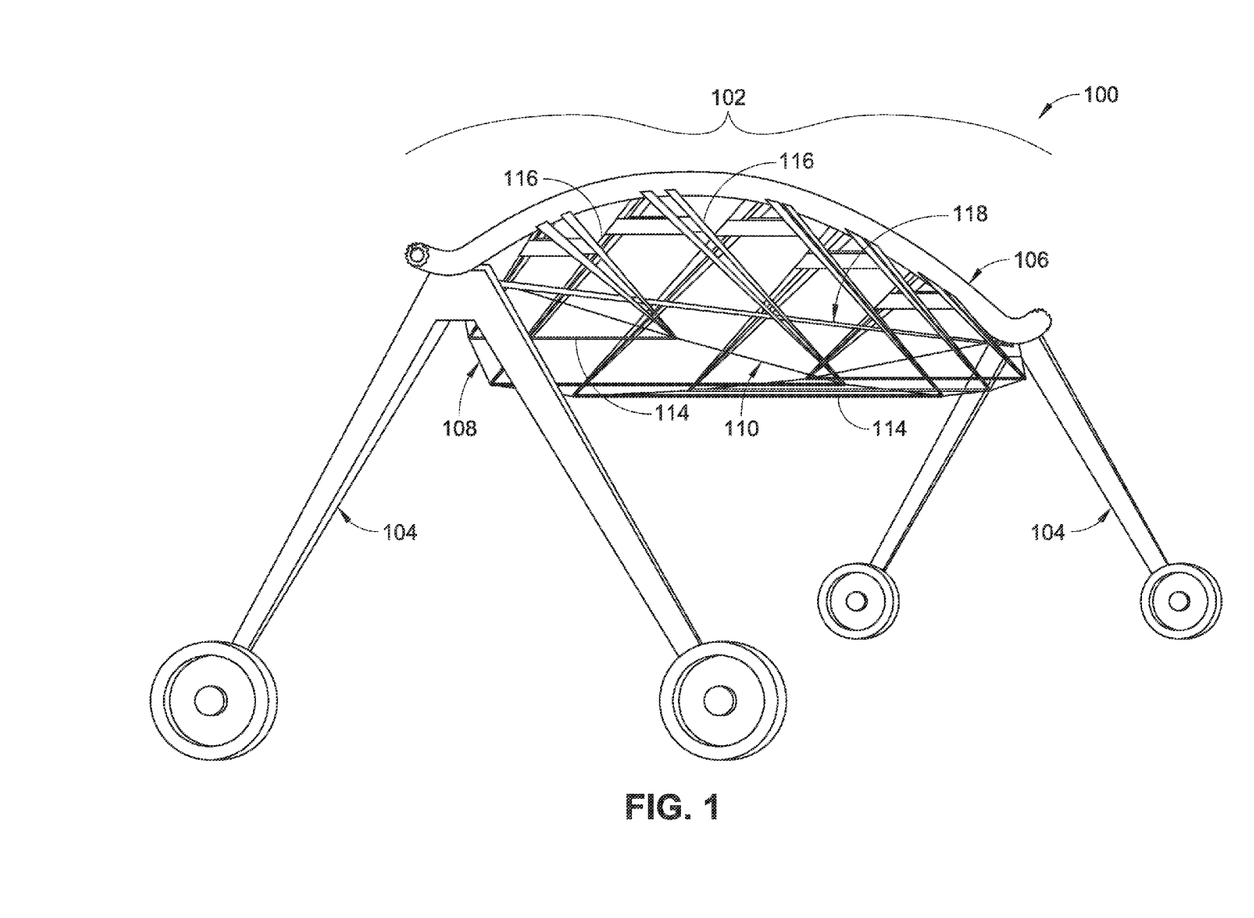
FIG. 1 is a perspective view illustrating an overhead irrigation assembly having two truss rods in a bow strung truss configuration and a third truss rod extending between wheeled towers supporting a span of pipeline in accordance with an example implementation of the present disclosure.
Figure 2:
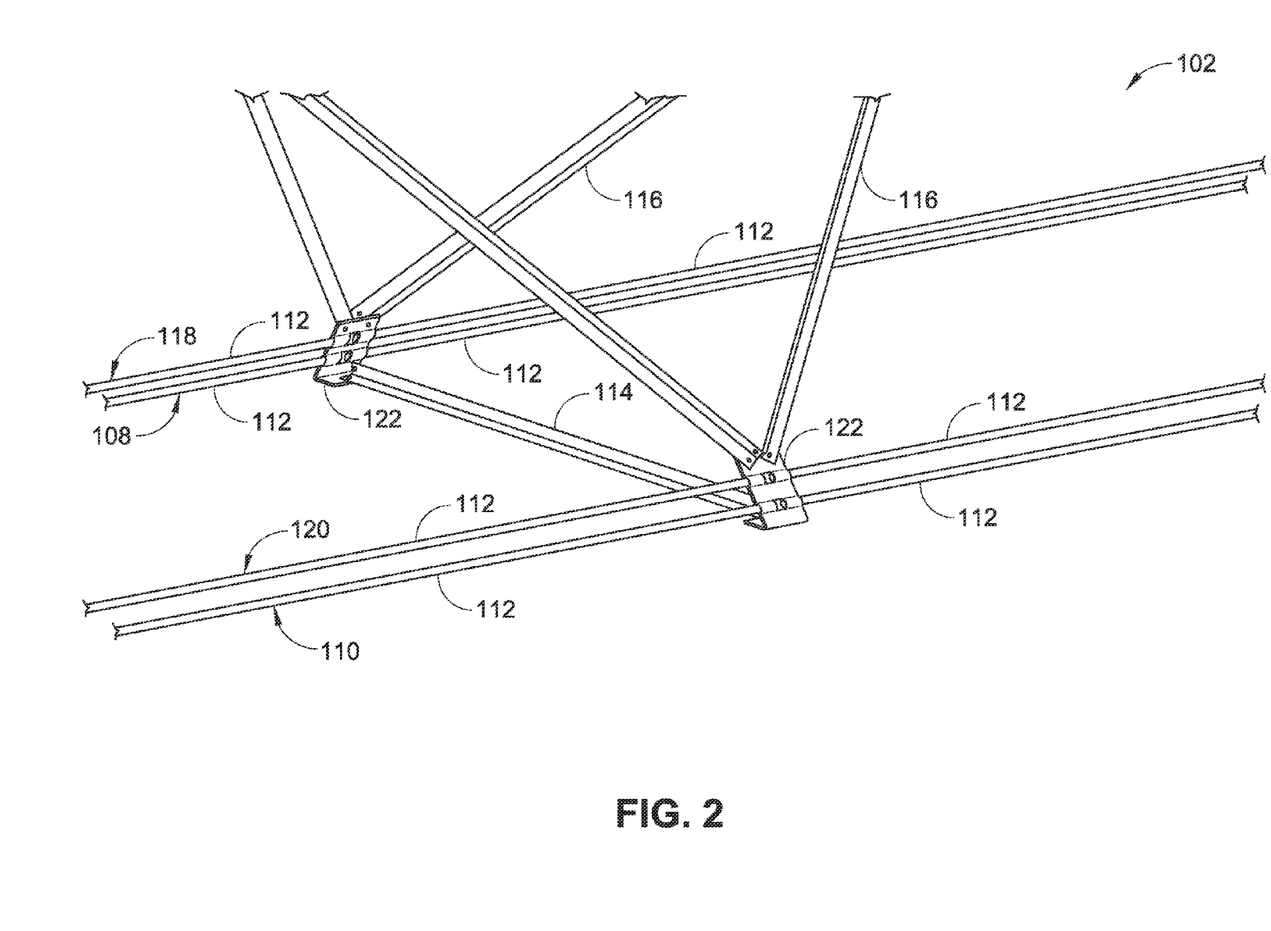
FIG. 2 is a partial isometric view illustrating a span of overhead irrigation equipment having four truss rods in accordance with an example implementation of the present disclosure.
Figure 3:
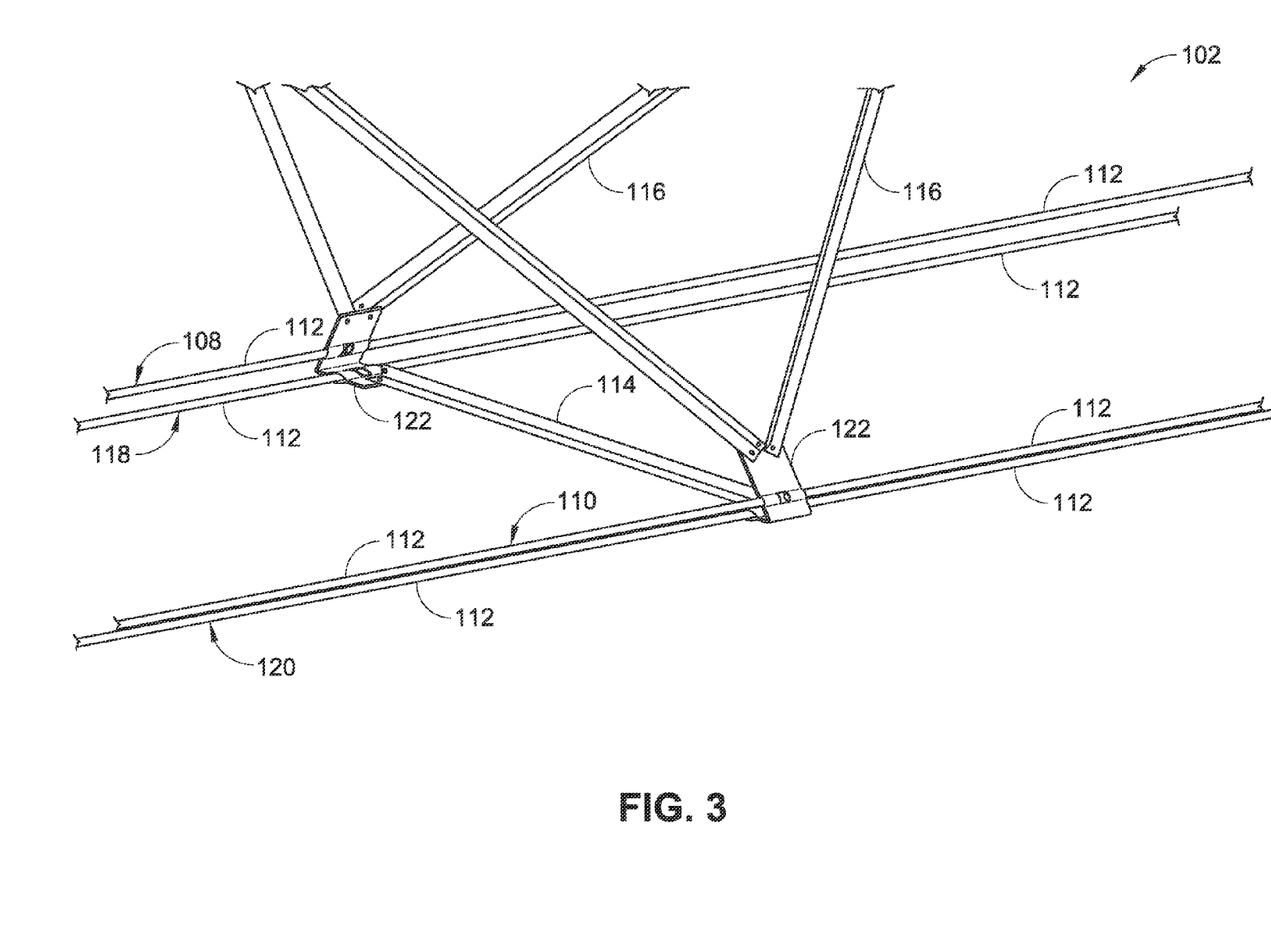
FIG. 3 is a partial isometric view illustrating another span of overhead irrigation equipment having four truss rods in accordance with an example implementation of the present disclosure.
Figure 4:
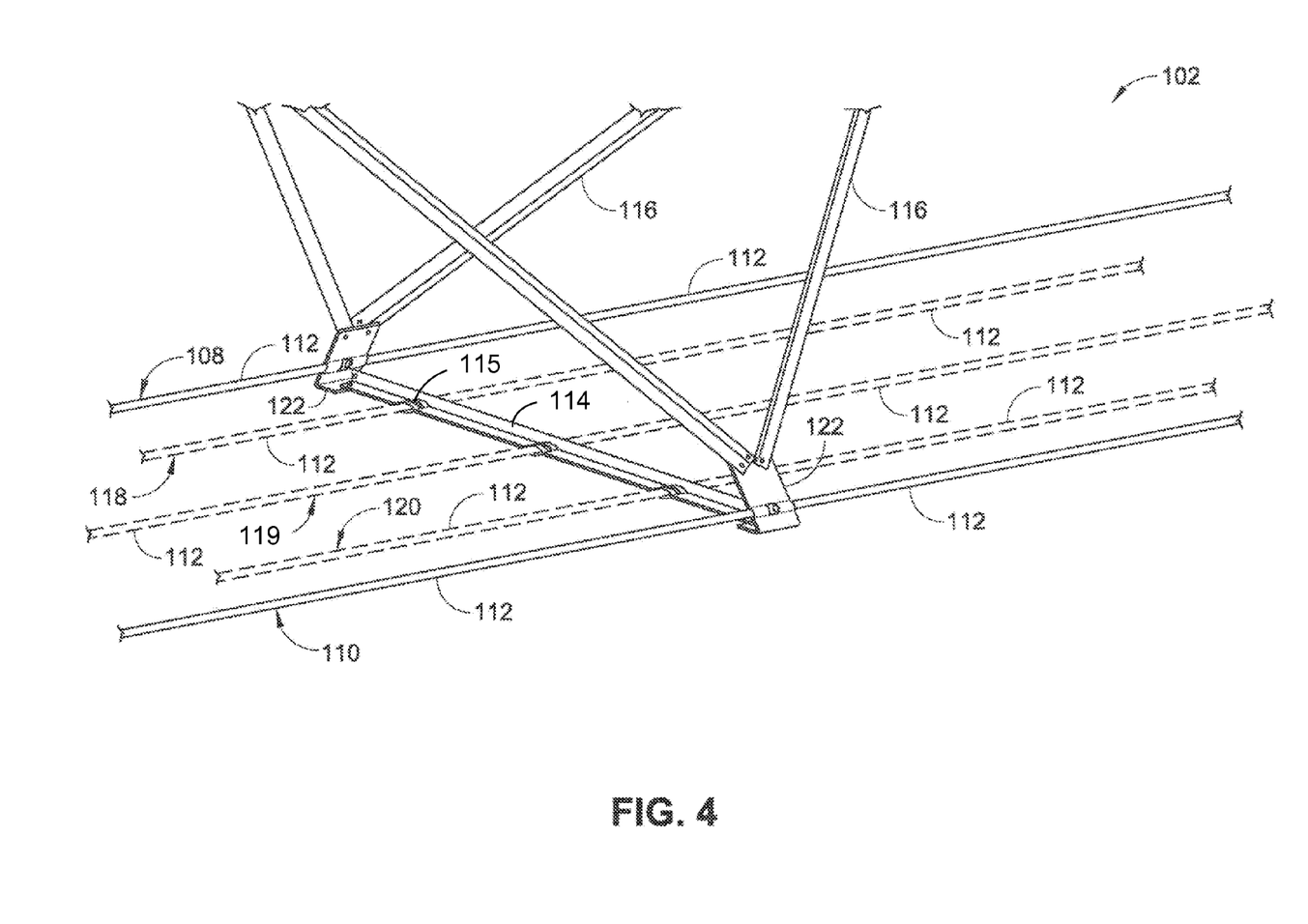
FIG. 4 is a partial isometric view illustrating a span of overhead irrigation equipment having a third truss rod positioned between two or more truss rods in accordance with an example implementation of the present disclosure.

Referring now to FIG. 1, the truss rod 118 may comprise a suspended truss rod having a series of end-to-end connected truss rod segments extending between the wheeled towers 104. In implementations, the truss rod 118 may be threaded at each end to allow balancing of the tensioning in the truss rod 108, the truss rod 110, and the truss rod 118. Referring to FIGS. 2 through 4, the truss rod 118 and/or the truss rod 120 may comprise a number of truss rod segments 112 extending longitudinally between the wheeled towers 104. The truss rod segments 112 may be arranged end-to-end and separated using the spreaders 114 suspended from the span of pipeline 106 (e.g., as previously described). In the examples illustrated in FIGS. 2 and 3, the truss rod 108, the truss rod 110, the truss rod 118, and the truss rod 120 may be connected together using angle brackets, such as sockets 122, which may be used to couple the spreaders 114 and the diagonals 116 together. In this type of configuration, each truss may include four diagonals 116, two sockets 122, and one spreader 114. The trusses are then connected together using the truss rods 108, 110, 118, and 120.

In some configurations, the truss rod 118 and/or the truss rod 120 may be positioned above the truss rod 108 and the truss rod 110. For example, as shown in FIG. 2, the truss rod segments 112 of the truss rod 118 and the truss rod 120 may be connected to socket 122 proximal to the diagonals 116. In other configurations, the truss rod 118 and/or the truss rod 120 may be positioned generally in the same plane as the truss rod 108 and the truss rod 110. For instance, as shown in FIG. 3, the truss rod segments 112 of the truss rod 118 and the truss rod 120 may be connected to socket 122 proximal to the spreaders 114. As shown in FIG. 4, the truss rod segments 112 of the truss rod 118 and/or the truss rod 120 may be connected end-to-end using the spreaders 114.

Thus, three or more truss rods may be provided. For example, in a configuration having three truss rods, truss rod 118 may be positioned between truss rods 108 and 110. In a still further configuration having five truss rods, truss rods 118 and 120 may be positioned proximal to truss rods 108 and 110 (e.g., as previously described), while a fifth truss rod 119 may be positioned between truss rods 118 and 120. As shown in FIG. 4, where three or more truss rods are provided, the center rods (118, 119 and 120) positioned between the far left rod (108) and the far right rod (110) may preferably extend through the spreader 114 using one or more conduit elements 115 formed into the spreader. It should be noted that a suspended truss rod (e.g., as described in FIG. 1 may also be included with any of the configurations described in FIGS. 2 through 4). Further, it should be noted that these configurations are provided by way of example only, and are not meant to be restrictive of the present disclosure. Thus, varying numbers of three or more truss rods may be provided in other various configurations in accordance with the present disclosure.

Figure 5:
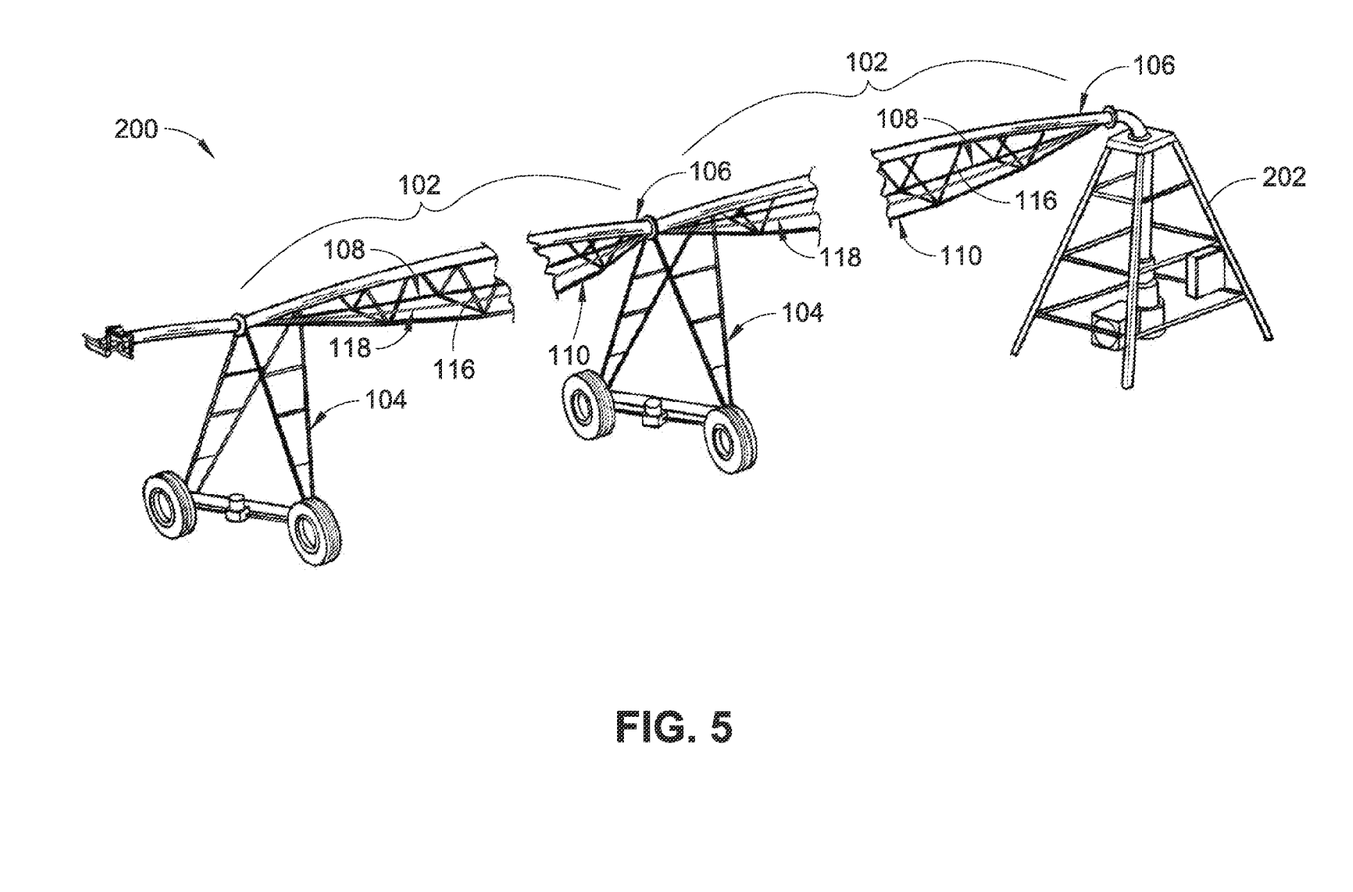
FIG. 5 is a partial diagrammatic perspective view illustrating an irrigation system having an overhead irrigation assembly having three or more truss rods in accordance with an example implementation of the present disclosure.

FIG. 5 generally illustrates a self-propelled center pivot irrigation system 200. As shown, the irrigation system 200 includes a center pivot structure 202 having an overhead irrigation assembly 100 as described above. For example, the irrigation system 200 includes one or more spans of overhead irrigation equipment 102. The overhead irrigation assembly 100 of the irrigation system 200 includes three or more truss rods tensioned between the wheeled towers 104. In an implementation, the overhead irrigation assembly 100 of the irrigation system 200 includes a truss rod 108, a truss rod 110, and a truss rod 118 (see FIG. 5). In another implementation, the overhead irrigation assembly 100 of the irrigation system 200 includes a truss rod 108, a truss rod 110, a truss rod 118, and a truss rod 120 (see FIG. 4). However, these implementations are provided by way of example only and are not meant to be restrictive of the present disclosure. Thus, the overhead irrigation assembly 100 of the irrigation system 200 may include various truss rod configurations (e.g., number of truss rods) per the requirements of the irrigation system 200.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An overhead irrigation assembly comprising:
   a first support;
   a second support;
   a span of pipeline supported between the first support and the second support;
   a first truss rod tensioned between the first support and the second support;
   a second truss rod tensioned between the first support and the second support;
   a plurality of spreaders suspended from the span of pipeline for separating the first truss rod from the second truss rod, wherein at least one spreader is comprised of a conduit element for allowing a truss rod to pass through the interior of the spreader;
   a plurality of diagonals, wherein the plurality of spreaders is suspended by the plurality of diagonals, further wherein the first truss rod is secured to a first diagonal using a first socket element and the second truss rod is secured to a second diagonal using a second socket element; and
   a third truss rod tensioned between the first support and the second support, wherein the first truss rod, the second truss rod, and the third truss rod are configured to maintain a bow shape in the span of pipeline; further wherein the first, second and third truss rods are substantially aligned in the same horizontal plane and the third truss rod is positioned between the first and second truss rods; further wherein the third truss rod is inserted through the conduit element of the at least one spreader comprised of the conduit element and passes though the interior of the at least one spreader comprised of the conduit element to attach between the first support and the second support.

2. The overhead irrigation assembly as recited in claim 1, further comprising:
   a fourth truss rod tensioned between the first support and the second support, the fourth truss rod configured to maintain the bow shape in the span of pipeline with the first truss rod, the second truss rod, and the third truss rod.

3. The overhead irrigation assembly as recited in claim 1, wherein the first truss rod and the second truss rod each comprise a plurality of truss rod segments extending longitudinally between the first support and the second support.

4. The overhead irrigation assembly as recited in claim 3, wherein the third truss rod comprises a plurality of truss rod segments extending longitudinally between the first support and the second support.

5. The overhead irrigation assembly as recited in claim 4, further comprising:
   a fourth truss rod tensioned between the first support and the second support, the fourth truss rod configured to maintain the bow shape in the span of pipeline with the first truss rod, the second truss rod, and the third truss rod.

6. The overhead irrigation assembly as recited in claim 5, wherein the fourth truss rod comprises a plurality of truss rod segments extending longitudinally between the first support and the second support.

7. An irrigation system comprising:
   a center pivot structure;
   an overhead irrigation assembly coupled to the center pivot structure, the overhead irrigation assembly comprising:
   a first support;
   a second support;
   a span of pipeline supported between the first support and the second support;
   a first truss rod tensioned between the first support and the second support;
   a second truss rod tensioned between the first support and the second support;
   a plurality of spreaders suspended from the span of pipeline for separating the first truss rod from the second truss rod, wherein at least one spreader is comprised of a conduit element for allowing a truss rod to pass through the interior of the spreader;
   a plurality of diagonals, wherein the plurality of spreaders is suspended by the plurality of diagonals, further wherein the first truss rod is secured to a first diagonal using a first socket element and the second truss rod is secured to a second diagonal using a second socket element; and
   a third truss rod tensioned between the first support and the second support, wherein the first truss rod, the second truss rod, and the third truss rod are configured to maintain a bow shape in the span of pipeline; further wherein the first, second and third truss rods are substantially aligned in the same horizontal plane and the third truss rod is positioned between the first and second truss rods; further wherein the third truss rod is inserted through the conduit element of the at least one spreader comprised of the conduit element and passes though the interior of the at least one spreader comprised of the conduit element to attach between the first support and the second support.

8. The irrigation system as recited in claim 7, further comprising:
   a fourth truss rod tensioned between the first support and the second support, the fourth truss rod configured to maintain the bow shape in the span of pipeline with the first truss rod, the second truss rod, and the third truss rod.

9. The irrigation system as recited in claim 7, wherein the first truss rod and the second truss rod each comprise a plurality of truss rod segments extending longitudinally between the first support and the second support.

10. The irrigation system as recited in claim 9, wherein the third truss rod comprises a plurality of truss rod segments extending longitudinally between the first support and the second support.

11. The irrigation system as recited in claim 10, further comprising:
- a fourth truss rod tensioned between the first support and the second support, the fourth truss rod configured to maintain the bow shape in the span of pipeline with the first truss rod, the second truss rod, and the third truss rod.

12. The irrigation system as recited in claim 11, wherein the fourth truss rod comprises a plurality of truss rod segments extending longitudinally between the first support and the second support.

\* \* \* \* \*